United States Patent
Eisenhower et al.

(10) Patent No.: US 6,813,895 B2
(45) Date of Patent: Nov. 9, 2004

(54) SUPERCRITICAL PRESSURE REGULATION OF VAPOR COMPRESSION SYSTEM BY REGULATION OF ADAPTIVE CONTROL

(75) Inventors: Bryan Eisenhower, East Hartford, CT (US); Christopher G. Park, Birmingham, MI (US); Pengju Kang, Hartford, CT (US); Alan Finn, Hebron, CT (US); Tobias Sienel, Manchester, CT (US)

(73) Assignee: Carrier Corporation, Syracuse, NY (US)

(*) Notice: Subject to any disclaimer, the term of this patent is extended or adjusted under 35 U.S.C. 154(b) by 0 days.

(21) Appl. No.: 10/655,970

(22) Filed: Sep. 5, 2003

(65) Prior Publication Data

US 2004/0050080 A1 Mar. 18, 2004

Related U.S. Application Data

(62) Division of application No. 09/850,784, filed on May 8, 2001, now Pat. No. 6,627,309.

(51) Int. Cl.[7] ................................................ F25B 49/00
(52) U.S. Cl. ...................... 62/115; 62/176.3; 62/228.5
(58) Field of Search ............................... 62/115, 176.3, 62/226, 228.1, 228.5

(56) References Cited

U.S. PATENT DOCUMENTS

| | | | | |
|---|---|---|---|---|
| 4,696,167 A | * | 9/1987 | Matsui et al. ................. | 62/180 |
| 4,744,511 A | * | 5/1988 | Kakehi et al. ................. | 236/13 |
| 4,873,649 A | | 10/1989 | Grald et al. | |
| 5,301,101 A | | 4/1994 | MacArthur et al. | |
| 5,415,005 A | * | 5/1995 | Sterber et al. ................. | 62/154 |
| 5,526,292 A | | 6/1996 | Hodgson et al. | |
| 5,557,555 A | * | 9/1996 | Friot et al. ...................... | 703/3 |
| 6,006,142 A | | 12/1999 | Seem et al. | |
| 6,264,111 B1 | | 7/2001 | Nicolson et al. | |
| 6,415,614 B1 | * | 7/2002 | Greenfield et al. ........... | 62/112 |
| 6,694,763 B2 | * | 2/2004 | Howard ...................... | 62/228.3 |

* cited by examiner

Primary Examiner—William E. Tapolcai
(74) Attorney, Agent, or Firm—Carlson, Gaskey & Olds

(57) ABSTRACT

A vapor compression system includes a compressor, a gas cooler, an expansion device, and an evaporator. Refrigerant is circulated through the closed circuit cycle. Preferably, carbon dioxide is used as the refrigerant. Adaptive control is employed to optimize the coefficient of performance of the vapor compression system. As the system changes over time, a model that operates the system is modified. The model is determined by an adaptive control algorithm including variable coefficients. As the model changes, the variables of the adaptive control algorithm change. A control of the gas cooler is then adjusted to regulate the high pressure of the system, and therefore the coefficient of performance. In a first example, Least Mean Squares (LMS) is used to modify the variables of the adaptive control algorithm to optimize the coefficient of performance. In a second example, the coefficient of performance is optimized by a slowly varying periodic excitation method. A third example employs triangularization to find the optimal coefficient of performance.

20 Claims, 3 Drawing Sheets

SUPERCRITICAL PRESSURE REGULATION OF VAPOR COMPRESSION SYSTEM BY REGULATION OF ADAPTIVE CONTROL

This is a divisional of application Ser. No. 09/850,784, filed May 8, 2001 now U.S. Pat. No. 6,627,309.

BACKGROUND OF THE INVENTION

The present invention relates generally to a system for regulating the high pressure component of a transcritical vapor compression system by employing adaptive control.

Traditional vapor compression systems are designed to run at zero superheat, or below the critical temperature of the refrigerant. Vapor compression Systems that operate subcritically are commonly optimized by choosing load characteristics (high side heat rejection), input characteristics (low side heat absorption), and refrigerant characteristics (high/low side refrigerant temperature and superheat).

Chlorine containing refrigerants have been phased out in most of the world as they have a negative effect on ozone. Hydrofluoro carbons (HFCs) have been used as replacement refrigerants, but these refrigerants may also have negative effects. "Natural" refrigerants, such as carbon dioxide and propane, have been proposed as replacement fluids. Carbon dioxide has a low critical point, which causes most air conditioning systems utilizing carbon dioxide to run partially above the critical point, or to run transcritical, under most conditions. The pressure of any subcritical fluid is a function of temperature under saturated conditions (when both liquid and vapor are present). However, when the temperature of the fluid is higher than the critical temperature (supercritical), the pressure becomes a function of the density of the fluid.

When a vapor compression system is run transcritical, it is advantageous to regulate the high pressure component of the system. By regulating the high pressure of the system, the capacity and/or efficiency of the system can be controlled and optimized. By operating the system transcritically, the pressure and the temperature of heat rejection can both be independently controlled.

Adaptive control can be employed to modify variable coefficients in an adaptive control algorithm. By modifying the variable coefficients in the adaptive control algorithm, the optimal variable setpoint reference that achieves maximum capacity can be obtained.

In a prior vapor compression system, receding horizon control using Recursive Least Squares (RLS) has been used for model identification. Systems have also been optimized by adjusting control variables and solving the system through direct matrix inversion. Both of these approaches automatically adjust the variable speed of the heat pump, the blower speed, and the evaporator superheat of a vapor compression system to optimize the coefficient of performance of the system.

SUMMARY OF THE INVENTION

A vapor compression system in basic form includes a compressor, a gas cooler, an expansion device, and an evaporator. Refrigerant is circulated though the closed circuit cycle. Carbon dioxide is used as the refrigerant. As carbon dioxide has a low critical point, systems utilizing carbon dioxide as a refrigerant usually require the vapor compression system to run transcritical. When the system is run transcritical, it is advantageous to regulate the high pressure component of the vapor compression system to control and optimize the capacity and/or efficiency of the system. The overall efficiency of the system is determined by comparing the amount of useful energy extracted by the heat rejecting heat exchanger to the amount of energy expended to compress the refrigerant and to run any ancillary components of the system, such as heat exchanger fans or pumps.

As the environment and the system changes over time, the high pressure that provides the maximum coefficient of performance of the system changes. Adaptive control is employed to modify the model that operates the system to continually optimize the coefficient of performance. The model is determined by an adaptive control algorithm including variable coefficients. As the system changes over time, the model that operates the system is modified to optimize the coefficient of performance. As the variables of the adaptive control algorithm change, the model changes. A control of the heat rejecting heat exchanger is then adjusted based on the modifications to regulate the high pressure of the system and therefore the coefficient of performance.

In a first example, Least Mean Squares (LMS) is used to modify the variables of the adaptive control algorithm to optimize the coefficient of performance. In the first step, a system identification error is computed using a gradient descent methodology. In the second step, the model is adapted using the system identification error information. The model is modified such that the output of the model is substantially equal to the output of the system, reducing the system identification error to zero. A control is adjusted based on the adaptive control update to adjust the high pressure of the system in the heat rejecting heat exchanger to obtain the maximum coefficient of performance.

In a second example, the coefficient of performance is optimized by employing a slowly varying periodic excitation method to seek extreme conditions. Intelligent excitation and signal manipulation and filtering are employed to achieve an adaptive control update.

A third example employs triangularization to find the optimal coefficient of performance of the system. A triangle having three setpoints is established: one point is on the left hand side and has a positive slope, one point in on the right hand side and has a negative slope, and a midpoint lies between these points. After first establishing a triangle including three points, the adaptive control algorithm constricts the control variables and focuses on the old midpoint to define a new middle point. Triangularization is repeated until the maximum coefficient of performance is obtained. The system is then run at this input to maximize the coefficient of performance.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
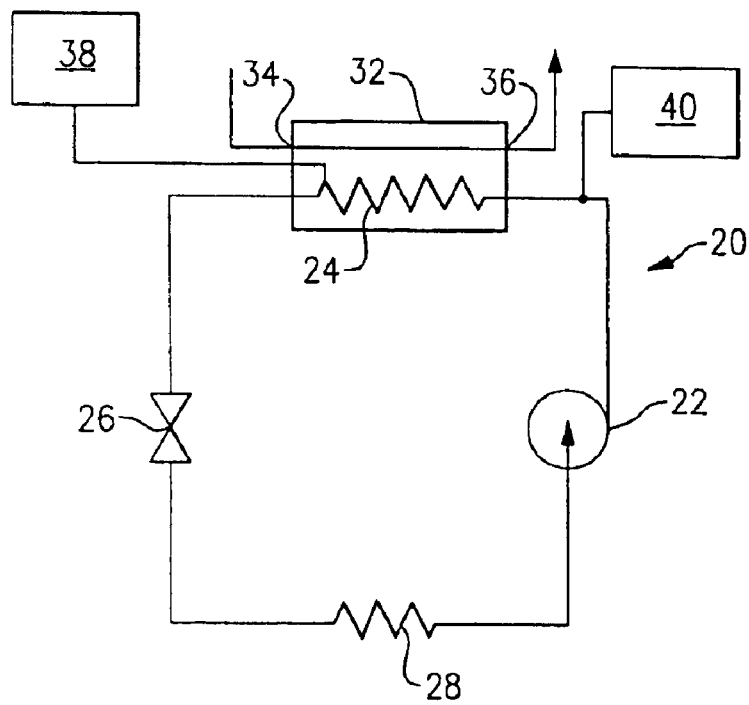
FIG. 1 illustrates a schematic diagram of a prior art vapor compression system.

FIG. 1 illustrates a vapor compression system 20 including a compressor 22, a gas cooler/condenser 24, an expansion device 26, and an evaporator. Refrigerant circulates though the closed circuit system 20.

The refrigerant exits the compressor 22 at high pressure and high enthalpy and flows through the gas cooler 24. In the gas cooler 24, the refrigerant loses heat, exiting the gas cooler 24 at low enthalpy and high pressure. A fluid medium, such as water or air, flows through a heat sink 32 and exchanges heat with the refrigerant passing through the gas cooler 24. For example, cooled water enters the heat sink 32 at the heat sink inlet 34 and flows in a direction opposite to the direction of flow of the refrigerant. After exchanging heat with the refrigerant, the heated water exits through the heat sink outlet 36. The refrigerant then passes through the expansion device 26, and the pressure drops. After expansion, the refrigerant flows through the evaporator 28 and exits at a high enthalpy and low pressure.

Preferably, carbon dioxide is used as the refrigerant. While carbon dioxide is illustrated, other refrigerants may be used. Because carbon dioxide has a low critical point, systems utilizing carbon dioxide as a refrigerant usually require the vapor compression system 20 to run transcritical.

Figure 2:
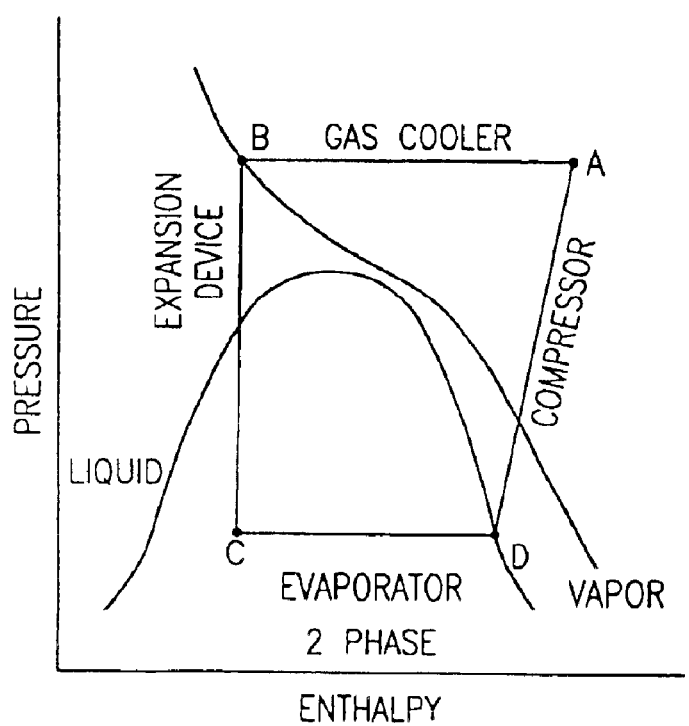
FIG. 2 illustrates a thermodynamic diagram of a transcritical vapor compression system.

The refrigerant exits the compressor 22 at high pressure and high enthalpy, shown by point A in FIG. 2. As the refrigerant flows through the gas cooler 24 at high pressure, it loses heat and enthalpy, exiting the gas cooler 24 with low enthalpy and high pressure, indicated as point B. As the refrigerant passes through the expansion device 26, the pressure drops, shown by point C. After expansion, the refrigerant passes through the evaporator 28 and exits at a high enthalpy and low pressure, represented by point D. After the refrigerant passes through the compressor 22, it is again at high pressure and high enthalpy, completing the cycle.

The overall efficiency of the system 20 is determined by comparing the amount of useful energy extracted by the gas cooler 24 to the amount of energy expended to compress the refrigerant in the compressor 22 and run any ancillary components of the system 20, such as heat exchanger fans or pumps. Therefore, the system performance (z(u)), or coefficient of performance, is defined as:

$$z(u) = \frac{\sum \text{Useful Energy}}{\sum \text{Parasitic Energy}} \quad \text{(Equation 1)}$$

The variable u is the pressure setpoint which is controlled by the control input to the expansion device 26. Therefore, the coefficient of performance of the system 20 is a function of the pressure setpoint.

When a vapor compression system 20 is run transcritical, it is advantageous to regulate the high pressure side of the system 20. By regulating the high pressure of the system 20, the coefficient of performance of the system 20 can be controlled and optimized. By operating the system 20 transcritically, the pressure and the temperature of heat rejection can be independently controlled.

Adaptive control of a transcritical vapor compression system 20 offers variable setpoint references and variable algorithm parameters that are used to achieve the setpoints. The variable setpoint references modify themselves to facilitate optimal operation of the system 20 regardless of external influences. That is, the setpoint references are modified to obtain the optimal coefficient of performance. By varying the parameters of the control algorithm, the impact of external influences on the coefficient of performance to achieve the setpoints is minimized.

The system 20 is operated by a model. As the environment and the system 20 change over time, the high pressure which provides the maximum coefficient of performance of the system 20 changes. If the model is not updated as the system 20 changes, the model does not properly operate the changed system 20, resulting in a non-optimal coefficient of performance. In the present invention, adaptive control is employed to modify the model to continually optimize the coefficient of performance of the system 20. The model is determined by an adaptive control algorithm including variable coefficients. As the system 20 changes over time, the variable coefficients of the adaptive control algorithm are changed to modify the model to optimize the coefficient of performance. The variables are modified based on influences such as ambient conditions and user-selected loading on the system 20.

Most adaptive control approaches include two steps: 1) initialization at a setpoint near to the expected optimum and 2) subsequent excitation to determine which direction in parameter space further maximizes the set of variables in question.

Preferably, there are two independent control loops in the system 20. A PID loop for setpoint control in the gas cooler 24 maintains regulatory control of the high side outlet temperature. An LMS loop for optimization of the coefficient of performance changes the setpoint according to how the system 20 is running. Both loops are coupled by the heat pump. Coupling is minimized by operating the loops on different time scales. The PID loop runs relatively quickly and the LMS loop runs relatively slowly. Therefore, the LMS loop does not respond to changes in the high side temperature input or output. The excitation of the system 20 for system identification runs between the speed of the PID loop and the speed of the LMS loop.

Figure 3:
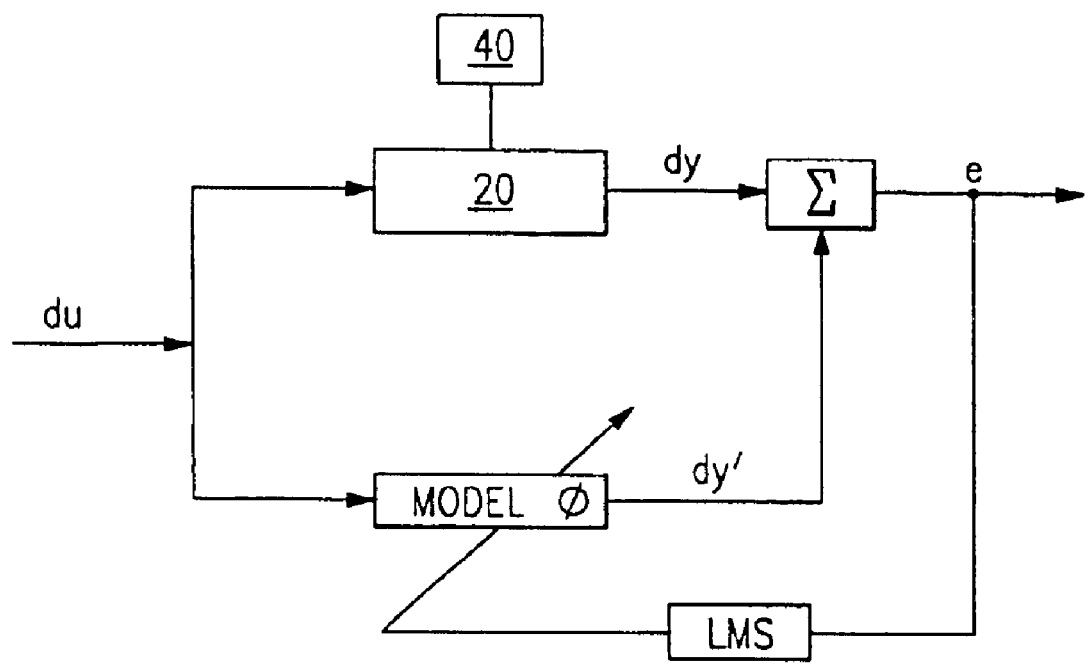
FIG. 3 schematically illustrates an adaptive control system employed to maximize the coefficient of performance of a transcritical vapor compression system employing the Least Mean Squares Approach.

In a first example, as shown in FIG. 3, Least Mean Squares (LMS) is used to modify the variables of the adaptive control algorithm to optimize the coefficient of performance. In the first step, a system identification error is computed using a gradient descent methodology. The system identification error is the difference between the output of the system and the output of the model. In the second step, the model is adapted using the system identification error information.

The system is identified by a Least Mean Squares (LMS) approach. The system 20 is first excited (du) by adjusting the control 38 (shown in FIG. 1). The output of the system (dy) is then compared to the output of the system model (dy').

The output of the system (dy) is sensed by a sensor 40. The system model (Φ) is the slope of the coefficient of performance (z(u)) with respect to the pressure setpoint (u). Therefore, the output of the system model (dy') is the product of the system model (Φ) and the first excitation (du).

The system 20 is excited bi-directionally to determine the direction in space which further maximizes the coefficient of performance (z(u)). The excitation (du) must be continuous to account for slow changes in the coefficient of performance. The frequency of the excitation (du) depends on system dynamics. A static relation is chosen for the model identification, and the response of the system 20 must appear to be static with respect to the control signal. In one example, the excitation (du) is a low amplitude sinusoidal input. The amplitude is chosen so that the excitation (du) perturbs the coefficient of performance (z(u)) outside levels of instrumentation noise.

The model (Φ) is determined by an adaptive control algorithm having variable coefficients. The system 20 and the optimal coefficient of performance (z(u)) of the system 20 change over time. The variable coefficients of the adaptive control algorithm are modified based on the state of the system 20 to adapt the system 20 to optimize the coefficient of performance. The variable coefficients are modified based on influences such as ambient conditions and user-selected loading on the system. The Least Mean Squares approach is employed to adapt the system model (Φ) so the output of the model (dy') matches the output of the system (dy).

After excitation (du) of the system, the output of the system (dy) is then compared to the output of the system model (dy') to determine the system identification error (e). The system identification error (e) is the difference between the output of the system (dy) and the output of the model (dy'), or $$e = dy - dy' = dy - \Phi du. \quad \text{(Equation 2)}$$

The system identification error (e) is then squared to obtain a positive quadratic function of model accuracy with respect to parameters of the model:

$$E[e^2] = E[dy^T] + \Phi^2[du du^T]\Phi - 2\Phi E[dy du]. \quad \text{(Equation 3)}$$

By differentiating, the gradient of the quadratic relation is obtained:

$$\nabla = \frac{\partial E[e^2]}{\partial \Phi} = 2\Phi E[du du^T] - 2E[dy du]. \quad \text{(Equation 4)}$$

By forcing discrete-time model updates in the direction of the gradient, the system identification error (e) is minimized (steepest descent methodology).

A model update parameter ($\bar{\mu}$) is employed to generate the identified model update. The model update parameter ($\bar{\mu}$) affects stability and convergence time of the system identification. The model update parameter ($\bar{\mu}$) is dependent on the excitation of the system (du) and is defined as:

$$\bar{\mu} = \frac{\mu}{\varepsilon + du^2} \quad \text{(Equation 5)}$$

The user defined adaptation constant ($\mu$) is typically chosen small, for example between 0.0 and 1.0. The normalization parameter ($\varepsilon$) alleviates numerical difficulties when the model update parameter ($\bar{\mu}$) is small and chosen based on expected minimum levels of the control signal. Normalization reduces noises and unknown system dynamics that occur during high amplitude excitation which can affect the model update parameter ($\bar{\mu}$).

The identified model update ($\Phi_{K+1}$) is defined as:

$$\Phi_{K+1} = \Phi_K + \bar{\mu}(-\nabla_K) \quad \text{(Equation 6)}$$

where k is a point in time. That is, the update model ($\Phi k+1$) is the sum of the current system model ($\Phi_K$) and the product of the model update parameter ($\bar{\mu}$) and the negative gradient ($-\nabla_K$).

After identification of the response to an input, the optimal adaptive control update to the input (du) to the system 20 is derived using the optimal control theory. The known quadratic cost function is defined as:

$$J(u) = z^T qz + du^T \sigma du. \quad \text{(Equation 7)}$$

In the quadratic cost function, q and σ are user defined compensation weights and z is the implied system performance parameter of the vapor compression system 20 near the mean operating point.

The system performance parameter (z) is defined as:

$$z = z_0 + \Phi du. \quad \text{(Equation 8)}$$

In the system performance parameter equation, $z_0$ is the mean operating point of the system performance parameter (z). The quadratic cost function J(u) is employed to penalize both the system performance parameter (z) and a control derivative. The parameters of the cost function J(u) are chosen while balancing the rate of convergence to the optimum and stability.

By solving for the extremum of the quadratic cost function J(u), the optimal adaptive control update is obtained:

$$du = \frac{-\Phi q}{\Phi^T q \Phi + \sigma}. \quad \text{(Equation 9)}$$

By employing the identified model update $\Phi_{K+1}$ in the optimal adaptive control update equation, the optimal adaptive control update can be obtained. The optimal adaptive control update (du) adapts the model (Φ) such that the output of the model (dy') is substantially equal to the output of the system (dy), reducing the system identification error (e) to zero. The control 38 is adjusted based on the adaptive control update (du) to adjust the high pressure of the system 20 in the gas cooler 24 to obtain the maximum coefficient of performance. In one example, the control 38 adjusts a variable speed pump for water flow through the gas cooler 24.

Figure 4:
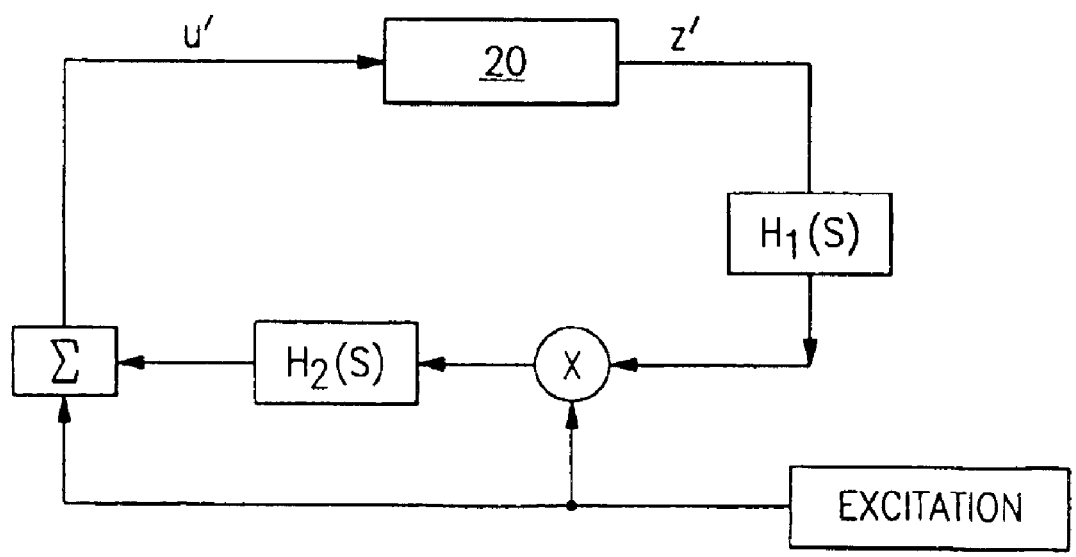
FIG. 4 schematically illustrates a system employed to maximize the coefficient of performance of a transcritical vapor compression system employing slowly varying periodic excitation.

In a second example, shown in FIG. 4, the coefficient of performance of the system 20 is optimized by employing a slowly varying periodic excitation method. Intelligent excitation and signal manipulation, including signal filtering, are employed to achieve an adaptive control update in the direction of the extreme.

The approach begins with a sinusoidal excitation of the system 20 superimposed on the mean setpoint. The frequency of the excitation is slow compared to the system dynamics. The sinusoidal excitation is defined as:

$$u' = \bar{u} + A \sin(\omega t) \quad \text{(Equation 10)}$$

where u' is the signal input to the system 20 and $\bar{u}$ is the mean signal input to the system 20.

The system response to the sinusoidal excitation (u') is:

$$z' = z_0 + z \sin(\omega t) \quad \text{(Equation 11)}$$

The response (z') is then filtered by a first dynamic filter $H_1(s)$ (s is the Laplace variable). The first dynamic filter $H_1(s)$ is high-pass in nature and removes the DC offset from the response (z'), resulting in a harmonic response. Therefore, the response (z') must have zero phase at the frequency of the sinusoidal excitation signal (u'). If the sinusoidal excitation signal (u') is chosen within the bandwidth of the system 20, the first dynamic filter $H_1(s)$ can partially account for dynamic interaction of the system 20. The first dynamic filter $H_1(s)$ also reduces instrumentation noise.

Assuming slow excitation, the harmonic response contains either an in-phase or out-of-phase sinusoidal response with respect to the sinusoidal excitation signal (u'). This phase characteristic facilitates the determination of the setpoint update in the direction of the extreme. If the system 20 is in phase, $\bar{u}$ is less than $u_{opt}$, where $u_{opt}$ is the optimum solution; alternately, if the system 20 is out of phase, then $\bar{u}$ is greater than $u_{opt}$.

The harmonic response is then multiplied by the initial excitation $\bar{u}$ to demodulate the harmonic response. By demodulating the harmonic response with the initial excitation $\bar{u}$, a relative static gain and the high-frequency harmonic information is obtained:

$$Z^* u = \tfrac{1}{2}\bar{u}z' - \tfrac{1}{2}\bar{u}z' \sin(2\omega t) \qquad \text{(Equation 12)}$$

The high frequency content is then filtered using a second dynamic filter $H_2(s)$. The second dynamic filter $H_2(s)$ is low-pass in nature and removes the oscillating factor [$\tfrac{1}{2}\bar{u}z'$ $\sin(2\omega t)$] to leave only the static gain ($\tfrac{1}{2}\bar{u}z'$). The static gain is similar to the slope of the system 20 coefficient of performance curve z(u). An integral-type controller coupled to the second dynamic filter $H_2(s)$ drives the relative static gain (or slope) of the system response (z') to zero. The second dynamic filter $H_2(s)$ supplies a new mean control signal sufficient to drive the slope to zero and facilitates the stability and performance of the control algorithm. The steady state gain of the second dynamic filter $H_2(s)$ must match the amplitude of the excitation for stability. In addition, the pole of the second dynamic filter $H_2(s)$ is chosen to distinguish needed information from the demodulation process. The frequency response of the second dynamic filter $H_2(s)$ can be shaped to decrease the bandwidth of the closed-loop system, increasing the convergence over time.

The filtered signal from the second dynamic filter $H_2(s)$ is then used as the input of the system 20. As the coefficient of performance z(u) is a function of the input (u') to the system 20, the coefficient of performance is modified to an optimal value. The control 38 is adjusted to adjust the high pressure of the system 20 in the gas cooler 24 to obtain the maximum coefficient of performance. The advantage of this method is that the system 20 identification does not interrupt the control, resulting in a better rate of convergance.

Figure 5:
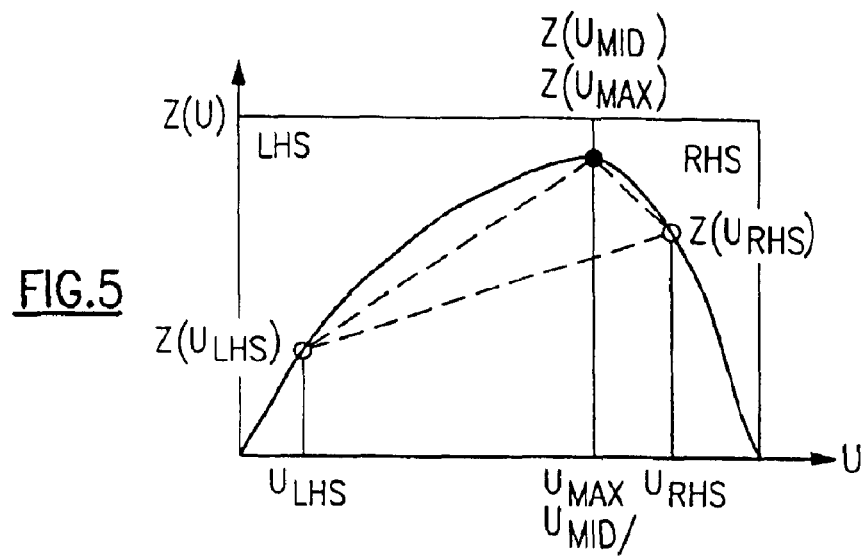
FIG. 5 schematically illustrates a system employed to maximize the coefficient of performance of a vapor compression system employing triangularization.

Referring to FIG. 5, a third example of the present invention employs triangularization to determine the maximum coefficient of performance (z(u)) of the system 20. Triangularization includes 1) discrete excitation of the system 20 and 2) memory of the system response to adaptively map the system 20. By intelligent movement of the control setpoint, a triangle can be established.

FIG. 5 illustrates a plot of the coefficient of performance z(u) as a function of the input (u) of the mean control variable of the system 20. A triangle having three setpoint conditions is established. One point $z(u_{LHS})$ is on the left hand side of the graph and is a positive value because the curve is a positive slope, one point $z(u_{RHS})$ is on the right hand side of the graph and is a negative value because the curve has a negative slope, and a point $z(u_{MAX})$ which indicates the maximum coefficient of performance z(u) lies between these points. Therefore, $$\left.\frac{\partial z}{\partial u}\right|_{u=uLHS} > 0; \text{ and } \left.\frac{\partial z}{\partial u}\right|_{u=uRHS} < 0; \to u_{\max} \in (u_{LHS}, u_{RHS}) \qquad \text{(Equation 13)}$$

Figure 6:
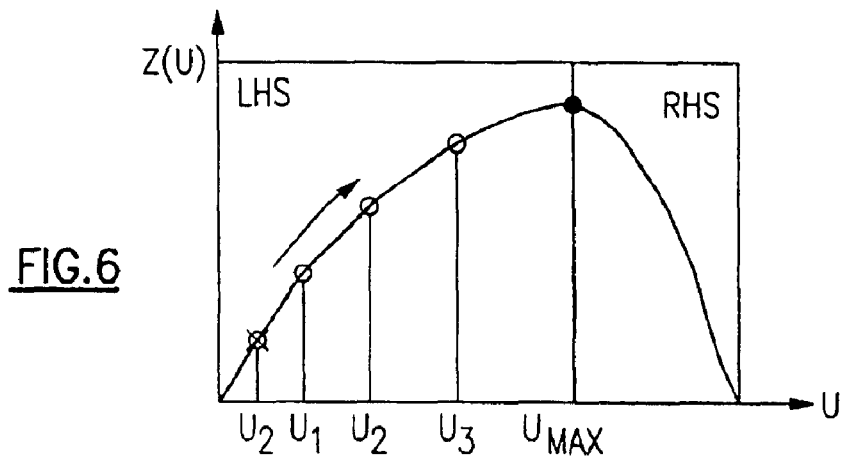
FIG. 6 schematically illustrates the initialization of the system of FIG. 5.

The history of the response of the system 20 is maintained to always retain a triangle of conditions having the extreme lying within. After first establishing a triangle including points $z(u_{LHS})$, $z(u_{RHS})$, $z(u_{MID})$, [$u_{MID}$ is a point between $z(U_{LHS})$ and $z(U_{RHS})$], the algorithm constricts the control variables and focuses on $U_{MID}$ to define a new middle point. For example, as shown in FIG. 6, the system 20 is first brought to operating point $u_1$. Movement is made from the first setpoint $u_1$ to a second setpoint $u_2$. If this movement results in a decreased coefficient of performance, movement is made in an opposite direction. For example, as shown in FIG. 6, movement to the left offers a decreased coefficient of performance. Movement is then made to the right which offers an increased coefficient of performance. A third set $u_3$ point is chosen in a direction similar to the direction of movement to the second setpoint $u_2$. This movement offers an increased coefficient of performance and the third setpoint $u_3$ is chosen. However, if this movement offered a decreased coefficient of performance, the third setpoint $u_3$ is chosen in an opposing direction. The identification of the triangle is accelerated if the proper choice of setsize is established. Therefore, if $$z(u_2) > z(u_1) \to \text{correct direction } u_3 > u_2;$$

and if $$z(u_2) < z(u_1) \to \text{wrong direction } u_3 < u_1. \qquad \text{(Equation 14)}$$

The initial stepsize must be chosen small so an initial step in the wrong direction will not degrade system 20 performance. The minimum stepsize is the minimum amount of control variation needed to vary the coefficient of performance. The time in which each step is made is based on characteristics of the dynamic response of the system 20.

However, a minimal stepsize must be designated to ensure that if the nonlinear coefficient of performance z(u) changes over time, the changes will be tracked by the algorithm (persistent excitation). The stepsize must also be limited to a maximum for the initialization process to limit it from overshoot from one side of the maximum to the other.

The choice of the stepsize is established by multiplying a gain, such as Fibonacchi's golden ratio (k=1.618), by the last successful stepsize:

$$\Delta u_{new} = k \Delta u_{old}, k > 1. \qquad \text{(Equation 15)}$$

Figure 7:
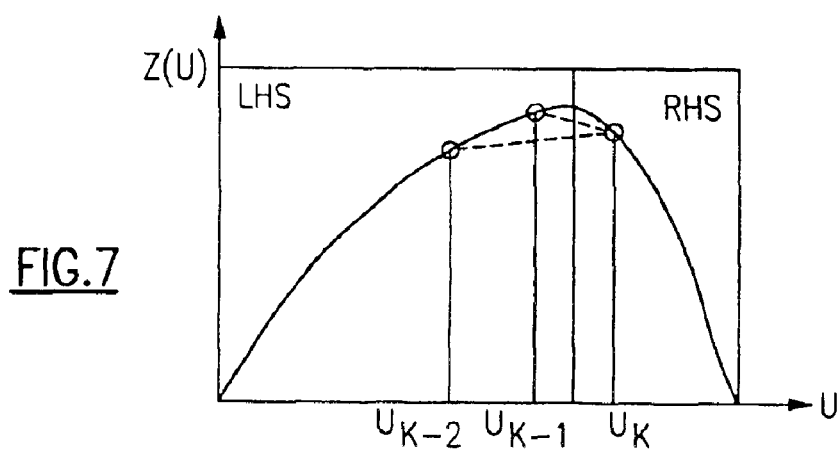
FIG. 7 schematically illustrates the triangularization found of the system of FIG. 5.

As shown in FIG. 7, initialization is continued until a triangle having a maximum performance $u_{k-1}$ situated within the setpoints $u_k$ and $u_{k-2}$ is obtained. To verify this, the perturbations are monitored until a set of three setpoint conditions having one maximal value situated between two smaller values is obtained. When this condition is met, the following is true:

$$z(u_{k-1}) > z(u_{k-2});$$

and $$z(u_k) < z(u_{k-1}) \rightarrow \text{triangle established.} \quad \text{(Equation 16)}$$

Once a triangle is established, initialization is complete. The algorithm then constricts the size of the triangle by focusing on the current midpoint $u_{k-1}$. New setpoints are chosen as logical perturbations from the midpoint $u_{k-1}$, while considering the farthest previous point from the midpoint $u_{k-1}$ of the previously accepted triangle. By considering the farthest previous points, the triangle is reduced in size. Additionally, if the stepsize is chosen based on the previous stepsize, the algorithm deccelerates when nearing the maximum, facilitating stability.

The triangular restriction is repeated until the input (u) that obtains the maximum coefficient of performance z(u) is obtained. When the input (u) is obtained, the system 20 is then run at this input (u) to maximize the coefficient of performance z(u) of the system 20. The control 38 is adjusted to adjust the high pressure of the system 20 in the gas cooler 24 to obtain the maximum coefficient of performance.

Alternately, a single multiple input, multiple output (MIMO) adaptive controller can be utilized rather than the two independent controls PID and MS loops to provide faster coefficient of performance convergence and adaptation of the water temperature regulation. Simultaneously regulation of the high side outlet temperature and maximization of the coefficient of performance is accomplished using a multi-variable form of the gradient descent control and adaptation utilized to optimize the coefficient of performance discussed above. The water outlet temperature is not invariant with respect to the expansion device 26, and the coefficient of performance is influenced by the rate of energy extraction in the heat rejecting heat exchanger 24.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A method of regulating high pressure of A transcritical vapor compression system comprising the steps of:
    operating the system base on a model, and an adaptive control algorithm having variable coefficients operates the model;
    exciting the system with an excitation signal to generate a system output;
    comparing the system output to a model output of the model; and
    adapting the model to obtain a desired high pressure of the system by modifying the variable coefficients such that the model output of the model substantially equals the system output of the system.

2. The method as recited in claim 1, further comprising the steps of:
    compressing a refrigerant to the high pressure;
    cooling the refrigerant;
    expanding the refrigerant; and
    evaporating the refrigerant.

3. The method as recited in claim 2 further comprising the steps of:
    controlling a flow of the refrigerant through the step of cooling; and
    adjusting the step of controlling to obtain the desired high pressure.

4. The method as recited in claim 2 wherein the refrigerant is carbon dioxide.

5. The method as recited in claim 1 wherein the desired high pressure obtains a maximum coefficient of performance.

6. The method as recited in claim 1 wherein the step of comparing determines a system identification error.

7. The method as recited in claim 6 wherein the step of adapting utilizes the system identification error.

8. A method of regulating a high pressure of a transcritical vapor compression system comprising the steps of;
    operating the system base on a model; and
    adapting the model to obtain a desired high pressure of the system, wherein the step of adapting further includes the steps of:
    1) sinusoidally exciting the system with an exciation signal to generate a response;
    2) filtering the response to generate a harmonic response;
    3) multiplying the harmonic response by the excitation signal to demodulate the harmonic response to a demodulated harmonic response;
    4) filtering an oscillation factor from the demodulated harmonic response to separate a static gain; and
    5) utilizing the static gain as a new excitation signal.

9. A method of regulating high pressure of a transcritical vapor compression system comprising the steps of:
    operating the system base on a model; and
    adapting the model to obtain a desired high pressure of the system, wherein the step of adapting further includes the steps of:
    1) establishing a left input point, a right input point, and a middle input point therebetween;
    2) determining a coefficient of performance for each of the left input point, the right input point, and the middle input point;
    3) determining a left middle coefficient of performance of a left middle input point between the left input point and the middle input point and determining a right middle coefficient of performance of a right middle input point between the right input point and the middle input point;
    4) comparing the left middle coefficient of performance and the right middle coefficient of performance;
    5) determining which of the left middle coefficient of performance and the right middle coefficient of performance is a greater value;
    6) determining a new middle input point that corresponds to the greater value; and
    7) repeating step 1) to step 6) employing the new middle input point as the middle input point.

10. The method as recited in claim 8 further comprising the steps of:
    compressing a refrigerant to the high pressure;

cooling the refrigerant;

expanding the refrigerant; and evaporating the refrigerant.

11. The method as recited in claim 10 further comprising the steps of:

controlling a flow of the refrigerant through the step of cooling; and adjusting the step of controlling to obtain the desired high pressure.

12. The method as recited in claim 10 wherein the refrigerant is carbon dioxide.

13. The method as recited in claim 8 wherein the desired high pressure obtains a maximum coefficient of performance.

14. The method as recited in claim 8 further comprising the step of repeating steps 1) to 5) utilizing the new excitation signal as the excitation signal.

15. The method as recited in claim 9 further comprising the steps of:

compressing a refrigerant to the high pressure;

cooling the refrigerant;

expanding the refrigerant; and evaporating the refrigerant.

16. The method as recited in claim 15 further comprising the steps of:

controlling a flow of the refrigerant through the step of cooling; and adjusting the step of controlling to obtain the desired high pressure.

17. The method as recited in claim 15 wherein the refrigerant is carbon dioxide.

18. The method as recited in claim 9 wherein the desired high pressure obtains a maximum coefficient of performance.

19. The method as recited in claim 9 wherein the step of repeating utilizes the middle input point as the left input point if the right middle coefficient of performance is the greater value, and the step of repeating utilizes the middle input point as the right input point if the left middle coefficient of performance is the greater value.

20. A method of regulating a high pressure of a transcritical vapor compression system comprising the steps of:

compressing a refrigerant to the high pressure;

cooling the refrigerant with a fluid;

expanding the refrigerant;

evaporating the refrigerant;

operating the system based on a model;

adapting the model to obtain a desired high pressure of the transcritical vapor compression system;

exciting the system with an excitation signal to generate a system output;

comparing the system output to a model output of the model; and adjusting the high pressure of the system by adjusting a flow rate of the fluid in the step of cooling based on the step of comparing.

* * * * *

UNITED STATES PATENT AND TRADEMARK OFFICE
CERTIFICATE OF CORRECTION

PATENT NO. : 6,813,895 B2
APPLICATION NO. : 10/655970
DATED : November 9, 2004
INVENTOR(S) : Eisenhower et al.

It is certified that error appears in the above-identified patent and that said Letters Patent is hereby corrected as shown below:

ON THE TITLE PAGE:

Please delete:

Related U.S. Application Data
(62) Division of application No. 09/850,784, filed on May 8, 2001, now Pat. No. 6,627,309.

Signed and Sealed this

Second Day of September, 2008

JON W. DUDAS
*Director of the United States Patent and Trademark Office*